United States Patent
Posey

(10) Patent No.: US 7,686,549 B1
(45) Date of Patent: Mar. 30, 2010

(54) MOTORCYCLE STAND FOR MOTORCYCLE TRANSPORT

(76) Inventor: Todd Posey, P.O. Box 330157, Nashville, TN (US) 37203-7501

( * ) Notice: Subject to any disclaimer, the term of this patent is extended or adjusted under 35 U.S.C. 154(b) by 621 days.

(21) Appl. No.: 11/698,340

(22) Filed: Jan. 26, 2007

(51) Int. Cl.
B60P 7/08 (2006.01)

(52) U.S. Cl. .................................. 410/3; 410/7; 410/19

(58) Field of Classification Search .................. 410/2, 410/3, 7, 9, 22, 80; 211/20, 22; 224/501, 224/510, 536, 552, 42.38, 554, 570, 924; 248/503
See application file for complete search history.

(56) References Cited

U.S. PATENT DOCUMENTS

| 3,753,579 | A | 8/1973 | Kurilich | |
| 4,180,253 | A | 12/1979 | Ivers et al. | |
| 6,099,219 | A | 8/2000 | Bartholomay | 410/20 |
| 6,109,494 | A | 8/2000 | Pilmore | |
| 6,385,057 | B1 | 5/2002 | Barron | |
| 6,761,519 | B2 * | 7/2004 | Alderman | 410/3 |
| 6,802,493 | B2 | 10/2004 | Lance | |

FOREIGN PATENT DOCUMENTS

JP 03000657 1/1991

* cited by examiner

*Primary Examiner*—Stephen Gordon
(74) *Attorney, Agent, or Firm*—Waddey & Patterson, P.C.; Lucian Wayne Beavers; Dennis H. Núñez

(57) ABSTRACT

This invention is a motorcycle stand for securing a motorcycle to a vehicle. The apparatus has a hook which pulls down the foot peg of a motorcycle onto a receiving portion on the base member of the frame. The hook is attached to a sliding member which slides within an elongated cavity defined by the frame. This sliding motion is tilted so that the hook applies a forward force on the peg to more securely stabilize the front tire of the motorcycle. In addition, the motorcycle stand has a linkage with a groove which fits around a shaft so that the motorcycle peg is secured in a clamping position between the hook and the receiving portion. The device has locking apertures which aligns when the hook is placed in the clamping position for protecting the motorcycle against theft.

11 Claims, 2 Drawing Sheets

US 7,686,549 B1

MOTORCYCLE STAND FOR MOTORCYCLE TRANSPORT

BACKGROUND OF THE INVENTION

The present invention relates generally to devices for transporting a motorcycle in a vehicle.

More particularly, this invention relates to a motorcycle stand which secures a motorcycle for transportation.

Motorcycle owners require a device which can securely attach a motorcycle to a vehicle so that the motorcycle can be transported from one location to another. In addition, the motorcycle owner requires a method of locking the motorcycle to the vehicle in order to prevent theft. Often, motorcycle owners must use complicated securement systems in order to secure the motorcycle to the vehicle. These securement systems are often unstable, and take an inordinate amount of time to secure the motorcycle. Other motorcycle stands do not have the adjustability to accommodate different types of motorcycle models and designs. As a result, the motorcycle stand will only work for a particular model or motorcycle design.

For example, U.S. Pat. No. 6,109,494 discloses a motorcycle stand with a hook system. The hook system has a hook which catches a peg on a bracket attached to the bike. The peg is pulled down onto the base of the stand by a foot pedal. The hook thereby lowers the peg on the motorcycle into a secured position. However, this design has several disadvantages. First, the motorcycle is not held within the stand in a stable manner. The peg is simply pulled vertically down onto the base of the motorcycle stand and thus does not provide a force sufficient to stabilize the front tire. Furthermore, the design does not use the motorcycle pegs on the motorcycle but instead requires the owner to attach a separate bracket with pegs to the motorcycle for locking the motorcycle on the stand. Finally, the motorcycle is not locked to the stand and thus maybe easily stolen by a thief.

BRIEF SUMMARY OF THE INVENTION

An easy to use and fully adjustable motorcycle stand which provides an adequate force on the front tire is disclosed in this application. The motorcycle stand comes with a frame that is securable to a vehicle. A base member with a receiving portion designed to receive a motorcycle peg is mounted on the frame. In addition, the frame has a hook which is positioned above the receiving portion for engaging the peg. The hook pulls down the motorcycle peg onto the receiving portion so that the peg is clamped between the base member and the hook. The frame defines a cavity having an upper end tilted toward the back end of the frame. A sliding member is attached to the hook and is slid within this cavity so that the sliding member is tilted toward the back end of the frame. In this manner, the hook supplies both a vertical and horizontal force on the peg to provide an extra stabilizing force on the front tire of the motorcycle.

In order to pull the hook down, a lever is pivotally connected to a shaft on the frame so that the rotation of the lever slides the sliding member within the cavity. A linkage connects the sliding member to the shaft. This linkage defines a groove which secures around the shaft when the hook clamps the motorcycle peg. The linkage and the frame define locking apertures which align when the peg is placed on the receiving portion. A locking mechanism can be placed through the aligned locking apertures to protect against theft.

Accordingly, one object of the present invention is to provide a device which securely transports a motorcycle on a vehicle.

Another object of the present invention is to provide a simple mechanism for attaching the motorcycle to the vehicle.

Still another object of the present invention is to lock the motorcycle on the stand to prevent the motorcycle from being stolen.

Yet another object of the present invention is to use the foot pegs of the motorcycle to secure the motorcycle to the vehicle.

Still yet another object of the present invention is to provide a motorcycle stand which is fully adjustable and can be used with any motorcycle having foot pegs.

DETAILED DESCRIPTION OF THE INVENTION

Figure 1:
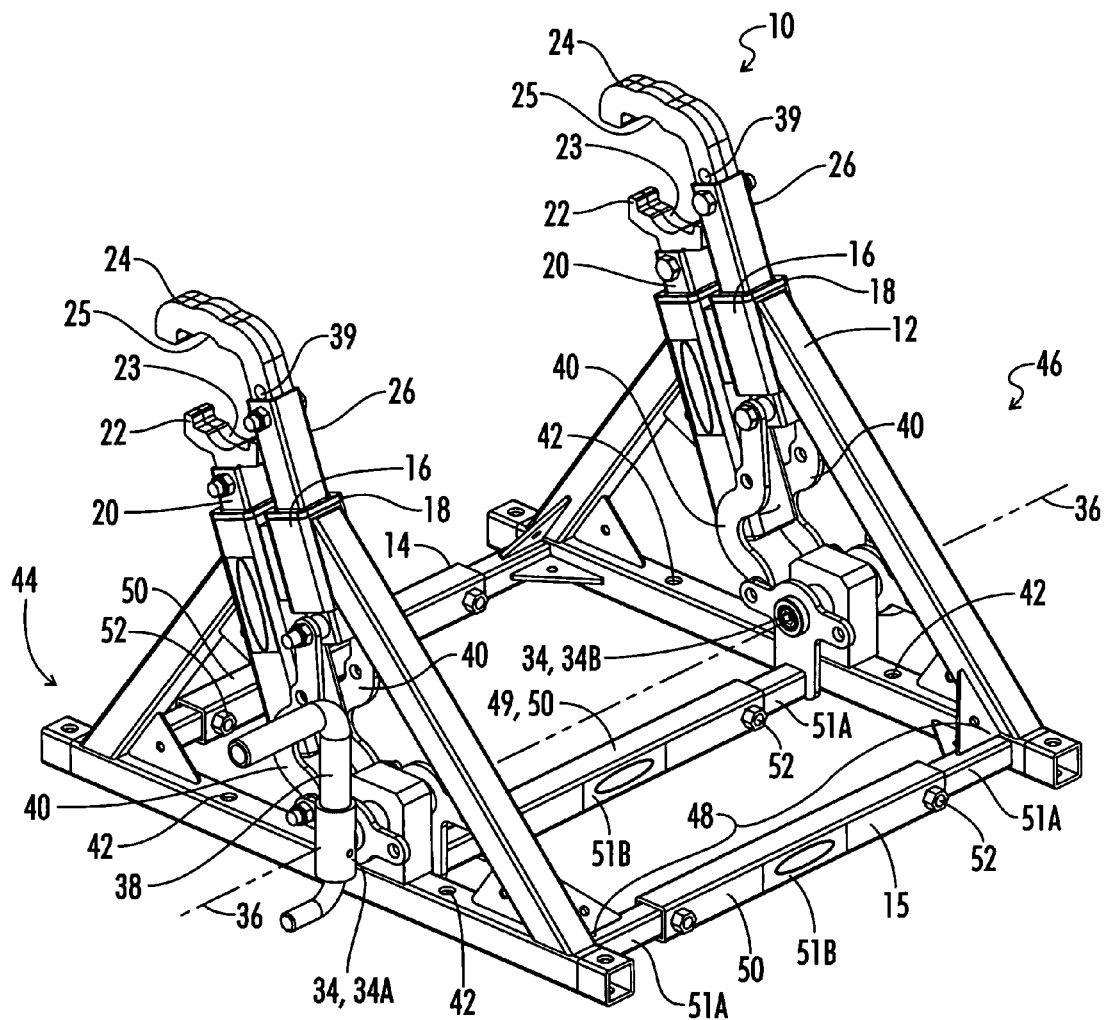
FIG. 1 is a front perspective view of one embodiment of the motorcycle stand.
Figure 2:
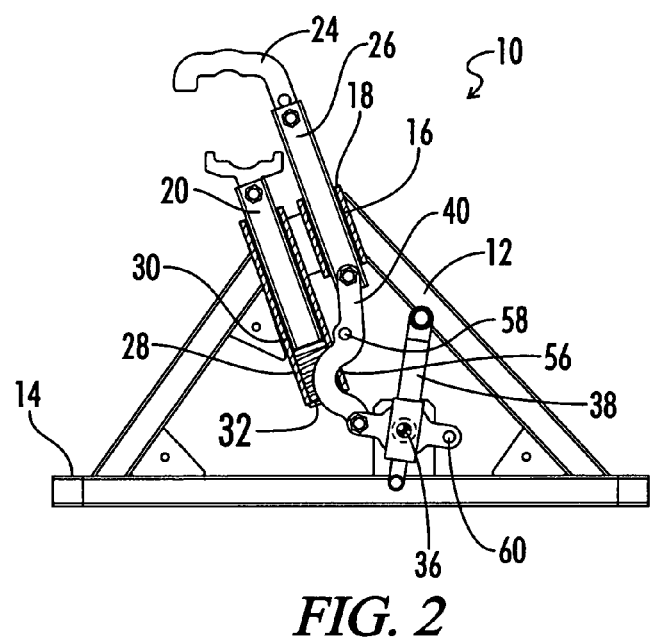
FIG. 2 is a side view of the motorcycle stand of FIG. 1.

Referring now to FIGS. 1 and 2, a motorcycle stand 10 for transporting a motorcycle with a peg on a vehicle is shown. In order to transport the motorcycle on stand 10, a frame 12 is secured to the vehicle. The frame defines a back end 14 and a front end 15. For most motorcycles, the motorcycle is guided through the frame 12 so that the front tire of the motorcycle is positioned in front of the front end 15 and the back tire is positioned behind the back end 14. The motorcycle can be guided through the frame until the motorcycle foot pegs engage the hook 24.

One of the advantages of this invention is the fact that the stand places an additional stabilizing force on the front tire in order to prevent the front tire from accidentally moving during travel. In order to accomplish this, the frame 12 has an elongated cavity 16 for sliding a sliding member 26 which is attached to the hook 24. The upper end 18 of the cavity is tilted toward the back end 14 of the frame 12. Thus, this sliding member 26 has a tilted slide relative the back end 14 of the frame 12 such that the hook applies both a vertical and a horizontal force on the motorcycle peg upon pull down to a clamping position. This tilt toward the back end 14 of the frame means that the hook 24 not only pulls the peg vertically down onto the receiving portion 22, but also pulls the peg toward the front end 15 which thereby applies an additional stabilizing force on the front tire of the motorcycle.

This hook 24 pulls the peg of the motorcycle onto a base member 20 mounted on the frame 12. The base member 20 has a receiving portion 22 designed to receive the motorcycle peg. Specifically, this receiving portion 22 of the base member 20 has a peg reception location 23 which actually engages the peg. Similarly, the hook 24 has a hook engagement location 25 which actually engages the peg when the peg is being lowered onto the peg reception location 23. The hook 24 is moveably connected to the frame and positioned above the receiving portion 22 in order to catch the peg. However, because the sliding member 26 is tilted toward the back end 14, the hook engagement location 25 is located behind the peg reception location 23. As can be seen, any hook system design in which the hook engagement location 25 is positioned behind the peg reception location 23 will require that the hook 24 pull the motorcycle peg toward the front end 15 when the peg is being secured to the motorcycle stand 10. Thus, the tilted sliding member design of the preferred embodiment provides an additional stabilizing force on the front tire of the motorcycle.

Referring now specifically to FIG. 2, the motorcycle stand 10 may also protect the peg from the compression resulting from the hook 24 clamping the peg on the receiving portion 22. As can be seen from FIG. 2, the receiving portion 22 is positioned at an initial height relative to the frame 12. When the hook 24 pulls down the peg onto the receiving portion 22, the hook 24 may sometimes pull the peg such that the peg pushes the receiving portion 22 below the initial height. If the receiving portion 22 were rigidly attached, then the peg would be compressed between the hook 24 and the receiving portion 22. Certain types of motorcycle models, especially unruggedized custom bikes which have light aluminum foot pegs, cannot withstand the additional compression force. Therefore, a resilient spring 28 is located between the frame 12 and the base member 20 such that the spring is compressed when the peg pushes the receiving portion 22 below the initial height. In this manner, the resilient spring 28 absorbs the additional compression force and protects the peg from damage.

In the preferred embodiment, the resilient spring 28 is received within a second elongated cavity 30 in the frame 12. This cavity 30 has an end 32 closed by a surface on the frame 12. Thus, the spring 28 is squeezed between the base member 20 and the end 32 as shown in FIG. 2. Whenever the receiving portion 22 is pushed below the initial height, the base member 20 is slid within the second elongated cavity 30 thereby compressing the spring 28.

Next, referring again to FIGS. 1 and 2, the motorcycle stand 10 provides a simplified mechanism for securing the motorcycle to the stand 10. Once the motorcycle is guided through the stand 10 so that the pegs engage the hook 24, the pegs may be lowered onto the receiving portion 22 by pivoting a lever 38, which in the preferred embodiment is a foot pedal. Normally, the motorcycle operator will simply sit on the motorcycle and guide the motorcycle until the hook 24 engages the peg. The owner can then simply push back on the lever 38 with their foot and place the peg in a clamped position between the hook 24 and the receiving portion 22.

In order to lower the hook 24 with the lever 38, the lever 38 is connected to a shaft 34 mounted on the frame 12. This shaft 34 has a shaft axis 36 wherein the lever 38 pivots about the shaft axis 36 to lower the hook 24. A linkage 40, also known as an arm member, connects the shaft 34 to the sliding member 26. This linkage 40 connects the shaft and the sliding member which causes the sliding member 26 to slide within the cavity 16 whenever the lever 38 is pivoted about the shaft axis 36. In this manner, the motorcycle driver can simply guide the motorcycle into the motorcycle stand and easily clamp the motorcycle peg in a clamping position with their foot.

Next, referring again to FIGS. 1 and 2, the motorcycle stand 10 is fully adjustable to accommodate the dimensions and configuration of any motorcycle with foot pegs. To accomplish this, the hook 24 has an adjustable length for adjusting a height of the hook 24 relative to the receiving portion 22. Thus, the height of the hook 24 can be adjusted to engage any foot peg on any motorcycle regardless of the pegs height above the ground. In the preferred embodiment, the hook 24 is provided with height adjust apertures 39 for selecting the height of the hook 24. The hook 24 is then positioned within the sliding member 26 so that an aperture in the sliding member lines up with the selected height adjustment aperture 39. A bolt or other similar mechanism is slid through the aligned apertures to assure that the hook 24 is positioned at the appropriate height relative to the receiving portion 22. The height of the receiving portion 22 can also be adjusted relative to the frame 12. As explained previously for the hook 24, the receiving portion 22 may also have height adjustment apertures (not shown) for determining a height of the receiving portion 22. An aperture on the base member is lined up with a height adjustment aperture on the receiving portion 22 to select the appropriate height.

In addition, as is shown in FIG. 1, the frame may have a first side 44 and a second side 46 with identical or similar hooking systems for securing the motorcycle pegs on both sides of the motorcycle. The first side 44 opposes the second side 46 to define a frame width 48. However, motorcycles come in a variety of widths; therefore, it is desirable that the frame width 48 be adjustable. In order to accomplish this, the frame has adjustable length cross supports 50 connected between the first side 44 and the second side 46. In the preferred embodiment, the adjustable length cross support 50 has a fixed member 51A attached on one side 44, 46 of the frame and pointing toward the other side 46,44 of the frame 12. These fixed members 51A fit within a hollow member 51B. By sliding these members 51A within the hollow member 51B, the frame width 48 can be selected. In order to select a particular frame width 48, a latch 52 is removably engaged with the fixed members 51A to set the frame width 48.

It is also desirable that the user of the motorcycle stand 10 be able to pull down the pegs on both sides of the motorcycle at the same time. In order to accomplish this, a first shaft 34A on the first side 44 is connected to a second shaft 34B on the second side 46 so that the shafts 34A, 34B can be rotated simultaneously. Normally, a shaft connection member 49 connects the first shaft 34A to the second shaft 34B so that rotating the lever 38 pulls down both hooks 24.

As shown in FIG. 1, once the frame width 48 has been selected, the frame 12 can be attached to the vehicle by any convenient means. In the preferred embodiment however, the frame 12 defines several vehicle securement apertures 42. A bolt or other similar device may be threaded into the vehicle securement apertures 42 and into the vehicle. In this manner, the motorcycle stand 10 is provided with a secure attachment to the vehicle. However, as stated previously, the motorcycle stand 10 may be attached to the vehicle by any convenient means. For example, the stand 10 may also be welded or held down by a cable support system to the vehicle.

Figure 3:
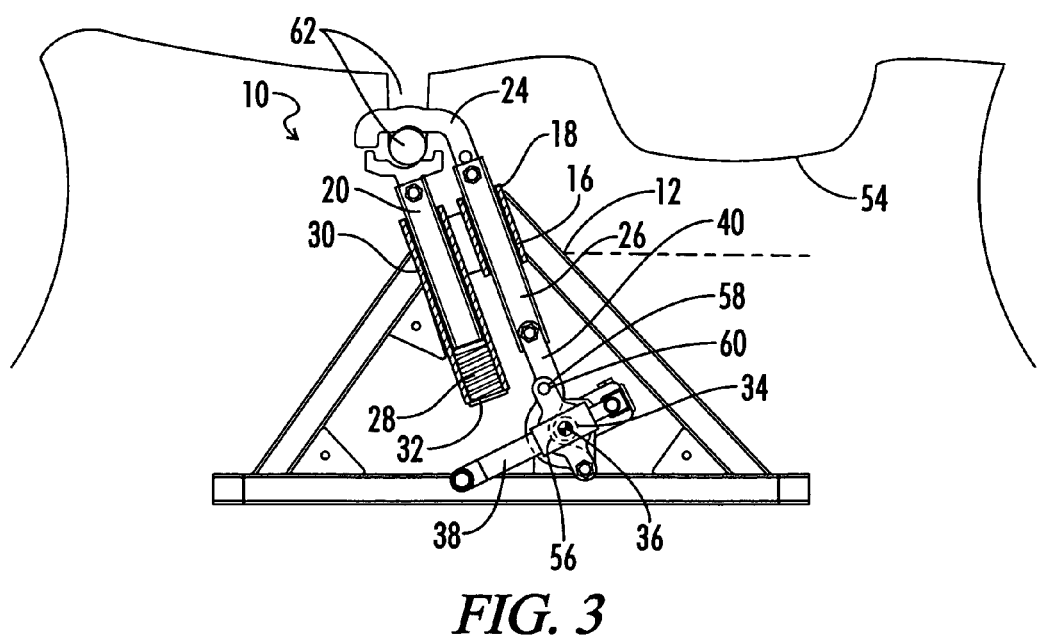
FIG. 3 is a side view of the same embodiment of the motorcycle stand in the clamping position showing a motorcycle foot peg clamped between the hook and the receiving portion of the base member.

Referring now to FIG. 2 and FIG. 3, a mechanism for securing the motorcycle stand 10 in an operative position for clamping the pegs 62 between the hook 24 and the receiving portion 22 is shown. When the pegs 62 of the motorcycle 54 are pulled down onto the receiving portion 22, the suspension of the motorcycle 54 will naturally attempt to push the pegs 62 back up into their normal position relative to the motorcycle 54. Therefore, a mechanism for resisting this upward force in order to secure the peg 62 between the hook 24 and the receiving portion 22 is needed. In order to accomplish this, the linkage 40 has a groove 56 defined therein. When the lever 38 is pushed back by foot action, the groove 56 fits around the shaft 34. In this manner, the shaft 34 provides the required resisting force which maintains the hook 24 in the operative position for clamping the peg 62.

Another function of the resilient spring 28 is to provide some leeway in setting the hook 24. By utilizing the resilient spring 28, the hook 24 does not have to be perfectly set above the receiving portion 22 to reach the clamping position. In other words, in the preferred embodiment, if the hook 24 reaches the receiving portion 22 before the groove 56 fits around the shaft 34, then the spring 28 provides some additional leeway to continue lowering the hook 24 and the receiving portion 22 to reach the clamping position.

As can be seen in FIG. 2 and FIG. 3, this structure also allows for the motorcycle stand 10 to be locked with any standard pad lock so that the motorcycle 54 cannot be stolen from motorcycle stand 10. In order to accomplish this, the linkage 40 has a first lock aperture 58. This lock aperture 58 is positioned on the linkage 40 so that it lines up with a second lock aperture 60 on a rotatable portion 61 attached to the shaft 34. Thus when the lever 38 is pivoted about the shaft axis 36, the first lock aperture 58 substantially aligns with the second lock aperture 60 when the groove 56 is secured around the shaft 34. The locking mechanism can be placed within the aligned first and second lock apertures 58, 60 thereby locking the motorcycle stand 10 in the operative clamping position. Since the peg 62 cannot be unclamped without unaligning the apertures 58, 60, the locking mechanism inserted through the aligned apertures 58, 60 protect the motorcycle 54 from theft.

Thus, although there have been described particular embodiments of the present invention of a new and useful Motorcycle Stand For Motorcycle Transport, it is not intended that such references be construed as limitations upon the scope of this invention except as set forth in the following claims.

What is claimed is:

1. A motorcycle stand for transporting a motorcycle with a peg on a vehicle, comprising:
   a frame securable to the vehicle and having a back end, the frame having an elongated cavity defined therein, the cavity having an upper end tilted toward the back end of the frame;
   a base member mounted on the frame and having a receiving portion designed to receive the peg;
   a hook positioned above the receiving portion for engaging the peg; and
   a sliding member attached to the hook and being slidable within the cavity whereby the peg is pulled down onto the receiving portion by sliding the sliding member within the cavity, the sliding member being tilted toward the back end of the frame such that the hook applies both a vertical and a horizontal force on the peg when the peg is being pulled down onto the receiving portion.

2. The motorcycle stand of claim 1, further comprising:
   the receiving portion being positioned at an initial height relative to the frame; and
   a resilient spring located between the frame and the base member such that the spring is compressed when the peg pushes the receiving portion below the initial height.

3. The motorcycle stand of claim 2, wherein:
   the frame defines a second elongated cavity, the second cavity having an end closed by a surface on the frame wherein the spring engages the end; and
   the base member being slidable within the second elongated cavity whereby the spring is compressed by the sliding of the base member within the second elongated cavity.

4. The motorcycle stand of claim 1, further comprising:
   a shaft mounted on the frame and having a shaft axis;
   a lever connected to the shaft wherein the lever pivots about the shaft axis; and
   a linkage connecting the shaft to the sliding member whereby pivoting the lever about the shaft axis slides the sliding member within the cavity.

5. The motorcycle stand of claim 1, wherein the hook has an adjustable length for adjusting a height of the hook relative to the receiving portion.

6. The motorcycle stand of claim 1, wherein the receiving portion has an adjustable height relative to the frame.

7. The motorcycle stand of claim 1, wherein the frame defines a vehicle securement aperture for securing the frame to the vehicle.

8. The motorcycle stand of claim 1, further comprising:
   the frame having a first side and a second side wherein the first side opposes the second side such that the frame has a frame width; and
   the first side further comprising:
      the base member;
      the hook; and
      the sliding member.

9. The motorcycle stand of claim 8, further comprising an adjustable length cross support connected between the first side and the second side for adjusting the frame width.

10. The motorcycle stand of claim 9, further comprising a latch removably engaged with the cross support to set the frame width.

11. The motorcycle stand of claim 8, further comprising:
   the second side further comprising:
      a second base member having a second receiving portion designed to receive a second peg on the motorcycle;
      a second hook movably connected to the frame and positioned above the second receiving portion for pulling down the second peg onto the second receiving portion;
   a first shaft mounted to the frame and rotating about a first shaft axis;
   a first linkage connecting the first shaft to the first hook whereby rotating the first shaft about the first shaft axis pulls the first peg onto the first receiving portion;
   a second shaft mounted to the frame and rotating about a second shaft axis;
   a second linkage connecting the second shaft to the second hook whereby rotating the second shaft about the second shaft axis pulls the second peg onto the second receiving portion; and
   the first shaft being connected to the second shaft so that the shafts can be rotated simultaneously.

* * * * *